United States Patent
Chen

(10) Patent No.: US 6,671,179 B2
(45) Date of Patent: Dec. 30, 2003

(54) COMPUTER ENCLOSURE WITH SNAP-ON BEZEL

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/174,374

(22) Filed: Jun. 18, 2002

(65) Prior Publication Data

US 2003/0210529 A1 Nov. 13, 2003

(30) Foreign Application Priority Data

May 9, 2002 (TW) .......................................... 91206532

(51) Int. Cl.[7] ................................................ G06F 1/16
(52) U.S. Cl. .................... 361/725; 361/679; 312/223.2; 211/26; 190/116
(58) Field of Search ................................ 361/725–727, 361/724, 679–687; 312/223.1–223.6; 211/26; 174/50, 58; 190/107, 116

(56) References Cited

U.S. PATENT DOCUMENTS 5,931,550 A * 8/1999 Chen .......................... 312/244
6,234,593 B1 * 5/2001 Chen et al. ............... 312/223.2
6,331,933 B1 * 12/2001 Rumney ...................... 361/679
6,375,288 B1 * 4/2002 Chen ........................ 312/223.1

* cited by examiner

Primary Examiner—Darren Schuberg
Assistant Examiner—Hung Van Duong
(74) Attorney, Agent, or Firm—Wei Te Chung

(57) ABSTRACT

A computer enclosure (1) includes a frame (10) and a front bezel (20). The frame has a bottom plate (30), and a front plate (40) extending perpendicularly from the bottom plate. A top flange (46) is bent perpendicularly inwardly from the front plate. A pair of spaced tabs (50) is bent perpendicularly inwardly from the top flange. A front portion of the bottom plate inwardly forms a pair of spaced protrusions (32). A plurality of guiding openings (41, 45) is defined in the front plate. The bezel includes a plurality of resilient arms (21, 25) extending through the guiding openings of the front plate. A hole (22, 27) is defined in each resilient arm, the hole engagingly receiving a respective one of the tabs or protrusions. The bezel is thereby securely mounted to the frame.

19 Claims, 5 Drawing Sheets

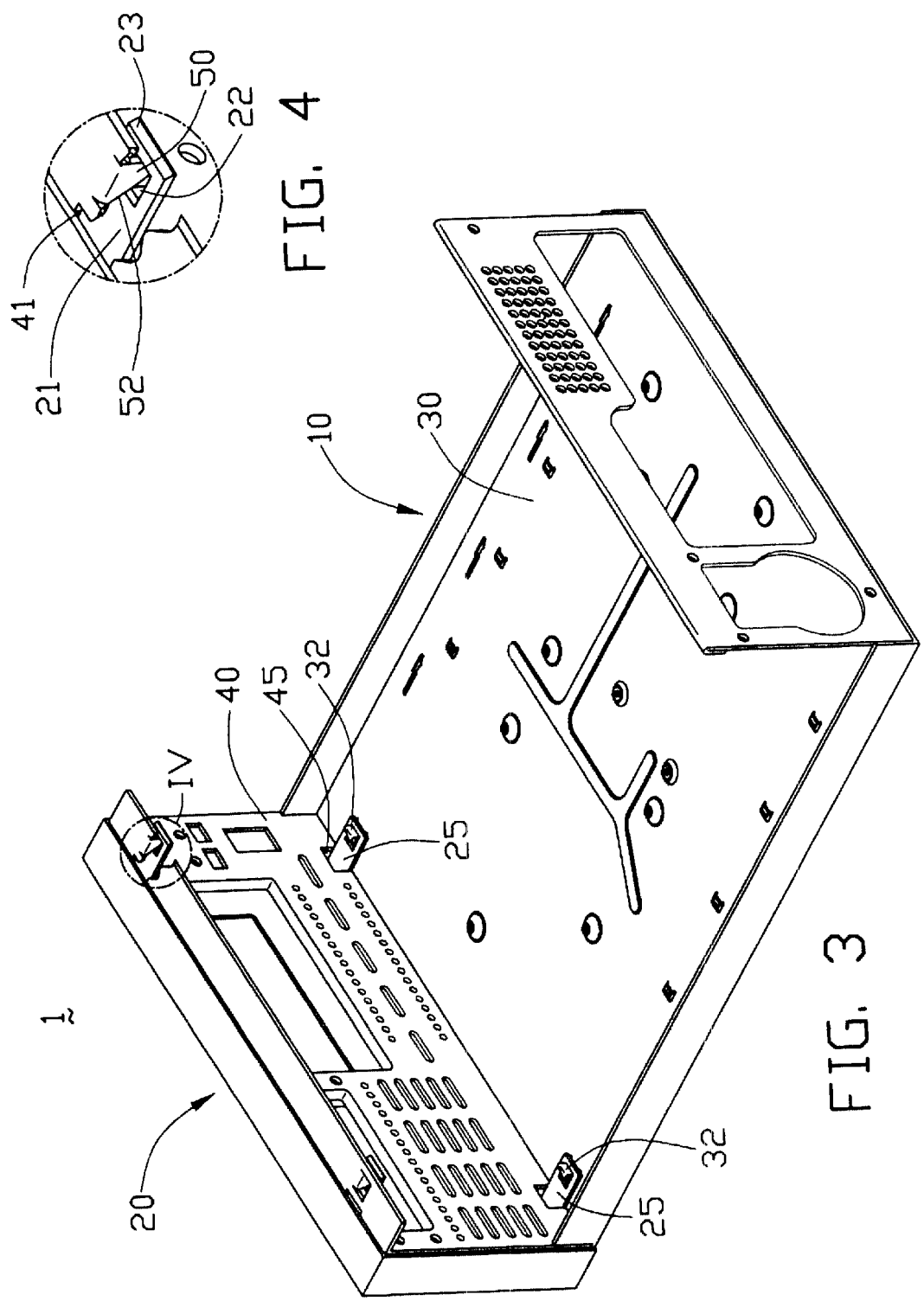

COMPUTER ENCLOSURE WITH SNAP-ON BEZEL

BACKGROUND OF THE INVENTION

1. Field of the Invention

The present invention generally relates to computer enclosures having bezels, and particularly to a computer enclosure having means for detachably locking a front bezel to a frame of the computer enclosure.

2. Description of the Prior Art

Referring to FIG. 6, a conventional computer enclosure 3 comprises a frame 120 and a bezel 110 mounted to the frame 120. The bezel 110 has a plurality of resilient arms 112, 114, and a plurality of positioning pins 116. The frame 120 comprises a front plate 132 having a plurality of openings 144 and bores 142 corresponding to the resilient arms 112 and the positioning pins 116, and a bottom plate 134 defining a plurality of openings 136 corresponding to the resilient arms 114.

In assembly of the computer enclosure 3, the resilient arms 114 are inserted into the openings 136. The bezel 110 is pushed toward the front plate 132, with the positioning pins 116 guiding the resilient arms 112 to enter the openings 144. The bezel 110 is thus engaged with the frame 120, with the resilient arms 112 hookingly engaging the front plate 132.

However, the above-described locking means of the computer enclosure 3 are unduly numerous and complex. Furthermore, in disassembly of the computer enclosure 3, the resilient arms 112 have to be unhooked by hand. This entails risk of injury to an operator's hands.

SUMMARY OF THE INVENTION

Accordingly, an object of the present invention is to provide a computer enclosure having a simple structure for securely mounting a bezel thereof to a front plate thereof.

Another object of the present invention is to provide a computer enclosure having a bezel that can be safely attached thereto and removed therefrom.

To achieve the above-mentioned objects, a computer enclosure in accordance with a preferred embodiment of the present invention includes a frame and a front bezel. The frame has a bottom plate, and a front plate extending perpendicularly from the bottom plate. A top flange is bent perpendicularly inwardly from the front plate. A pair of spaced tabs is bent perpendicularly inwardly from the top flange. A front portion of the bottom plate inwardly forms a pair of spaced protrusions. A plurality of guiding openings is defined in the front plate. The bezel includes a plurality of resilient arms extending through the guiding openings of the front plate. A hole is defined in each resilient arm, the hole engagingly receiving a respective one of the tabs or protrusions. The bezel is thereby securely mounted to the frame.

Other objects, advantages and novel features of the present invention will become more apparent from the following detailed description when taken in conjunction with the accompanying drawings, in which:

BRIEF DESCRIPTION OF THE DRAWINGS

FIG. 3 is an assembled view of FIG. 1, with part of the front bezel of the computer enclosure cut away for clearer illustration;

FIG. 4 is an enlarged view of a circled portion IV of FIG. 3;

DETAILED DESCRIPTION OF THE INVENTION

Figure 1:
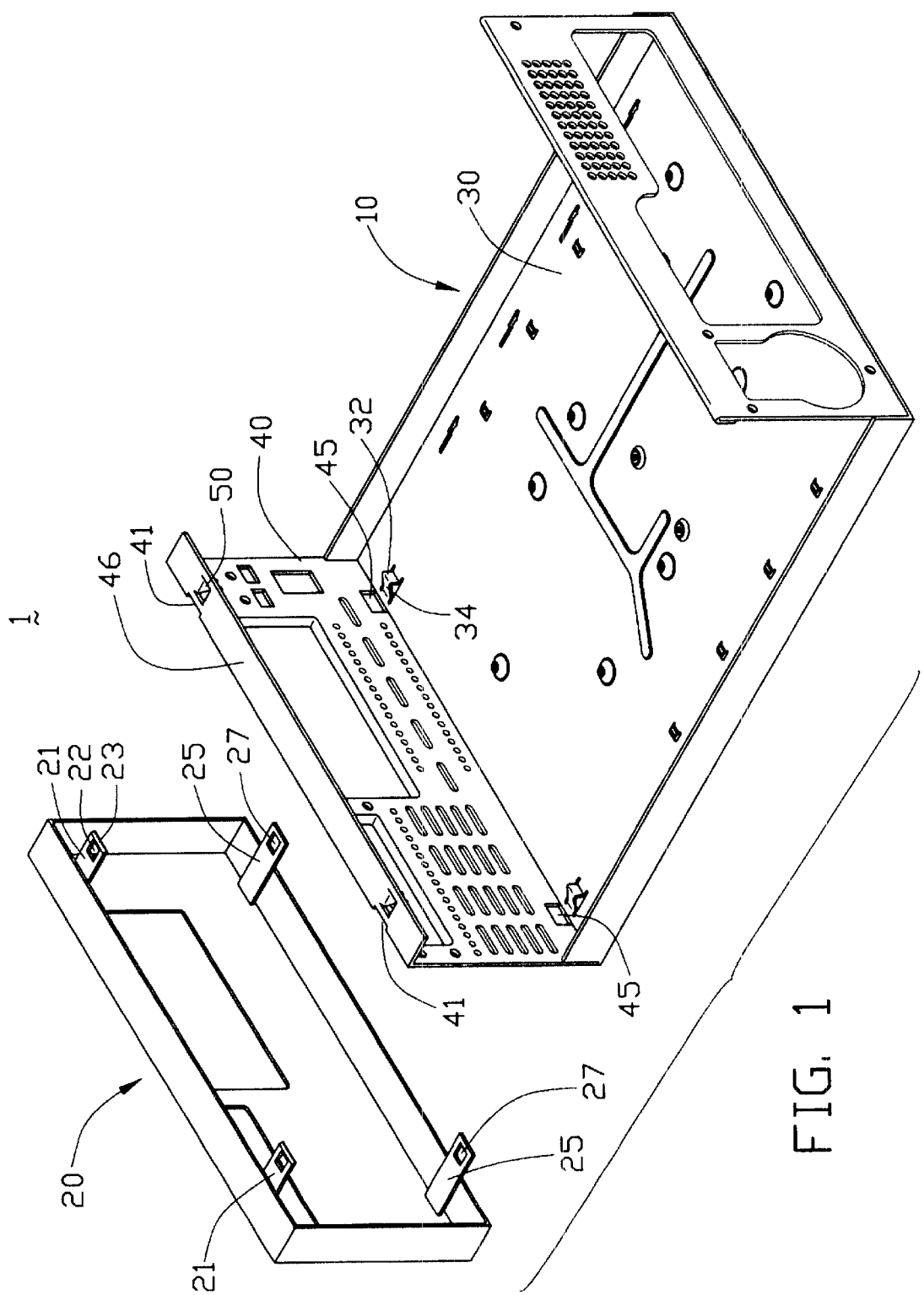
FIG. 1 is an exploded perspective view of a computer enclosure in accordance with a preferred embodiment of the present invention.
Figure 2:
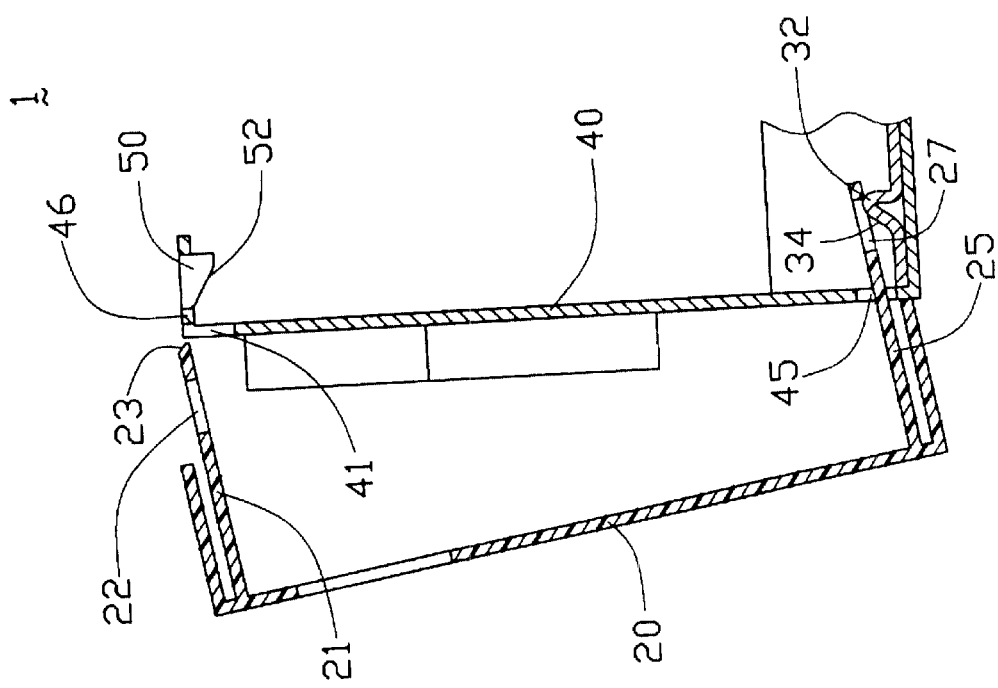
FIG. 2 is a partial cross-sectional view of the computer enclosure of FIG. 1 partly assembled, showing a front bezel and a front portion of a frame of the computer enclosure.

Referring to FIGS. 1 and 2, a computer enclosure 1 in accordance with a preferred embodiment of the present invention comprises a frame 10 and a front bezel 20. The frame 10 has a bottom plate 30, and a front plate 40 extending perpendicularly from the bottom plate 30. The front plate 40 is integrally connected with the bottom plate 30 such that the frame 10 comprises a single piece. The front bezel 20 is mounted to the front plate 40.

A top portion of the front bezel 20 comprises two spaced and inwardly-extending first resilient arms 21. A first hole 22 is defined in each first resilient arm 21 near a distal end thereof. Each first resilient arm 21 has an inclined edge 23 at a distal end thereof. A bottom portion of the front bezel 20 comprises two spaced and inwardly-extending second resilient arms 25. A second hole 27 is defined in each second resilient arm 25 near a distal end thereof. The front plate 40 defines two spaced first guiding openings 41 corresponding to the first resilient arms 21, and two spaced second guiding openings 45 corresponding to the second resilient arms 25. A top portion of the front plate 40 is bent perpendicularly inwardly to form a top flange 46. A pair of spaced holding tabs 50 is bent perpendicularly inwardly from the top flange 46, corresponding to the first holes 22. Each tab 50 has an inclined edge 52 at a bottom front extremity thereof, complementary to the inclined edge 23 of a corresponding first resilient arm 21. A front portion of the bottom plate 30 inwardly forms a pair of spaced holding protrusions 32, corresponding to the second holes 27. Each protrusion 32 has an inclined face 34 obliquely facing the front plate 40.

Referring also to FIGS. 3–4, in assembly of the computer enclosure 1, the second resilient arms 25 are inserted into the second guiding openings 45. The inclined faces 34 of the protrusions 32 facilitate distal ends of the second resilient arms 25 to move over the protrusions 32. Once the second holes 27 are above the protrusions 32, the front bezel 20 is pushed toward the front plate 40. The first resilient arms 21 are inserted into the first guiding openings 41. The inclined edges 23 slide along the inclined edges 52 until the tabs 50 are snappingly received in the first holes 22. At the same time, the protrusions 32 are engagingly received in the second holes 27. The front bezel 20 is thus securely mounted to the front plate 40. The distal ends of the first resilient arms 21 protrude inwardly beyond the top flange 46 to facilitate easy removal of the bezel 20 from the frame 10 when desired. To disassemble the computer enclosure 1, the distal ends of the first resilient arms 21 are pressed down until the tabs 50 are freed from the first holes 22. The above-described assembly procedure is then followed in reverse.

Figure 5:
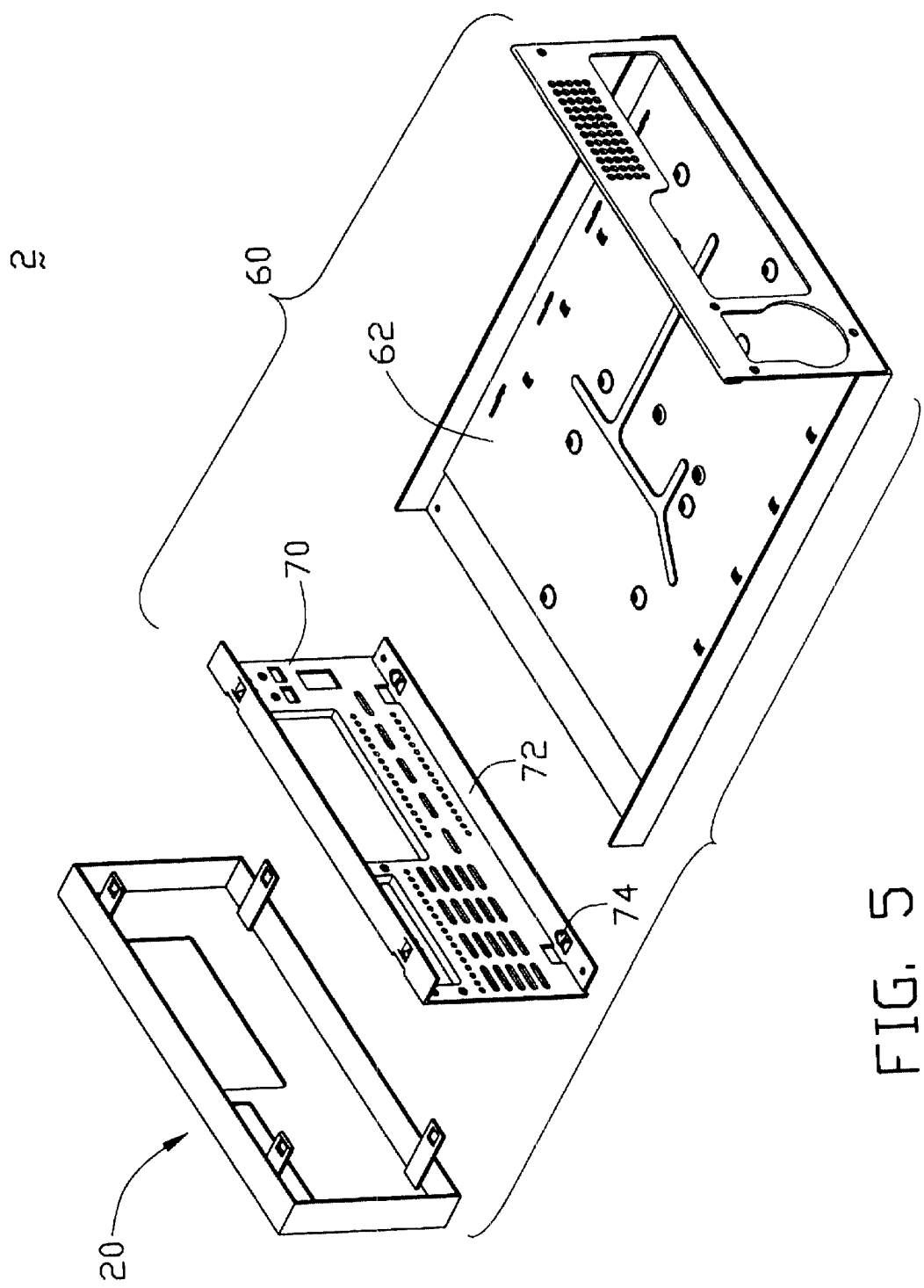
FIG. 5 is an exploded perspective view of a computer enclosure in accordance with an alternative embodiment of the present invention.
Figure 6:
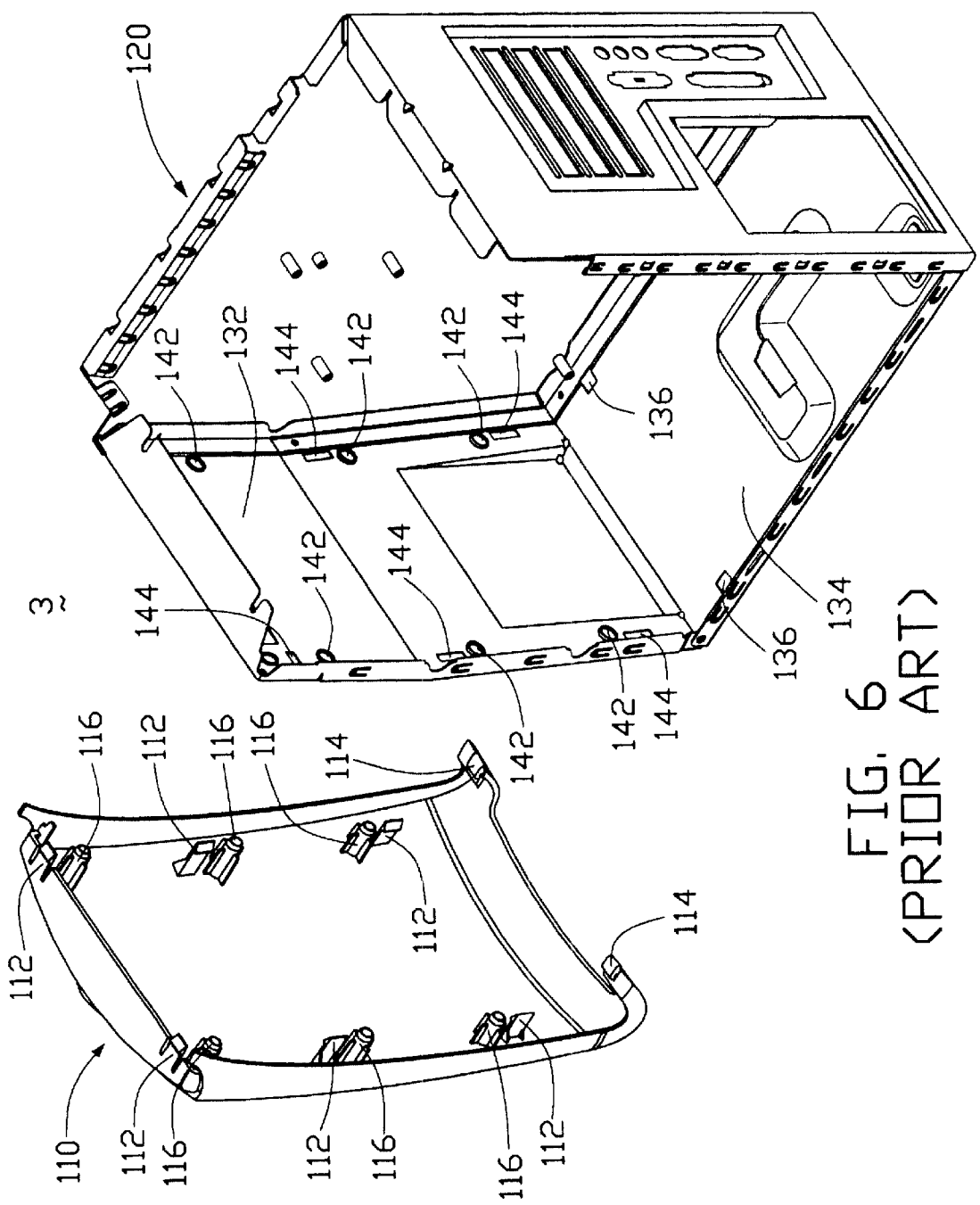
FIG. 6 is an exploded perspective view of a conventional computer enclosure.

FIG. 5 shows a computer enclosure 2 in accordance with an alternative embodiment of the present invention. The computer enclosure 2 comprises a frame 60 and a front bezel 20. The frame 60 has a bottom plate 62, and a separately-formed front plate 70 that is connected to the bottom plate 62 by conventional fastening means such as screws. The front plate 70 is similar to the front plate 40 of the preferred embodiment. However, a bottom portion of the front plate 70 is bent perpendicularly inwardly to form a bottom flange 72. A pair of protrusions 74 is inwardly formed near each of opposite ends of the bottom flange 72. Each pair of protrusions 74 is similar in profile and function to one protrusion 32 of the frame 10 of the preferred embodiment. Assembly of the computer enclosure 2 is similar to that of the computer enclosure 1 of the preferred embodiment. Reference is made to the foregoing description of assembly of the computer enclosure 1, with due alteration of details.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
    a frame comprising a first plate and a second plate substantially perpendicularly connected to the first plate, a first flange extending from the first plate, at least one first holding member extending from the first flange toward the second plate, at least one second holding member being formed opposing the at least one first holding member, a plurality of guiding openings being defined in the first plate; and
    a bezel comprising a plurality of resilient arms extending through the guiding openings of the first plate, a hole being defined in each of the resilient arms and receiving a corresponding one of the at least one first and second holding members thereby detachably fixing the bezel to the frame.

2. The computer enclosure as claimed in claim 1, wherein the first plate is integrally connected with the second plate such that the frame comprises a single piece.

3. The computer enclosure as claimed in claim 1, wherein the first plate connects the second plate by means of a third-party medium.

4. The computer enclosure as claimed in claim 1, wherein the at least one second holding member is formed at the second plate.

5. The computer enclosure as claimed in claim 1, wherein each of the at least one first and second holding members comprises a tab which has an inclined edge for guiding a corresponding resilient arm.

6. The computer enclosure as claimed in claim 1, wherein the at least one first holding member comprises a tab with an inclined edge for guiding a corresponding resilient arm, and the at least one second holding member comprises a protrusion with an inclined surface for guiding a corresponding resilient arm.

7. The computer enclosure as claimed in claim 1, wherein a free end of each of the resilient arms has an inclined face for sliding along a corresponding one of the at least one first and second holding members.

8. The computer enclosure as claimed in claim 1, wherein a free end of at least one of the resilient arms protrudes beyond the first plate for easy disassembly of the computer enclosure.

9. The computer enclosure as claimed in claim 3, wherein a second flange extends from the first plate opposing the first flange.

10. The computer enclosure as claimed in claim 9, wherein the at least one second holding member is formed at the second flange.

11. A computer enclosure comprising:
    a frame comprising a first plate and a second plate integrally connected with the first plate to form a single piece, a first flange extending from a top portion of the first plate, at least one first holding member extending from the first flange toward the second plate, at least one second holding member being formed at the second plate opposing the at least one first holding member, a plurality of guiding openings being defined in the first plate; and
    a bezel comprising a plurality of resilient arms extending through the guiding openings of the first plate, a hole being defined in each of the locking arms and receiving a corresponding one of the at least one holding first and second members thereby detachably fixing the bezel to the frame.

12. The computer enclosure as claimed in claim 11, wherein each of the at least one first and second holding members comprises a tab which has an inclined edge for guiding a corresponding resilient arm.

13. The computer enclosure as claimed in claim 11, wherein the at least one first holding member comprises a tab with an inclined edge for guiding a corresponding resilient arm, and the at least one second holding member comprises a protrusion with an inclined surface for guiding a corresponding resilient arm.

14. The computer enclosure as claimed in claim 11, wherein a free end of each of the resilient arms has an inclined face for sliding along a corresponding one of the at least one first and second holding member, and the free end of at least one of the resilient arms protrudes beyond the first plate for easy disassembly of the computer enclosure.

15. A computer enclosure comprising:
    a frame including a front plate defining a pair of opposite edge sections;
    a pair of guiding openings formed in said edge sections, respectively, said pair of guiding openings extending through said plate in a front-to-back direction;
    a pair of locking portions formed on two opposite planes respectively joined with said front plate around said two opposite edge sections in a perpendicular relation, each of said locking protrusions respectively aligned with the corresponding guiding openings in said front-to-back direction; and
    a bezel dimension similar to the front plate, said bezel including a pair of resilient arms integrally extending rearwardly from two side portions of the bezel, each of said arms defining a locking section around a distal end thereof; wherein
    the locking section of each of said resilient arms latchably engages the corresponding locking portion.

16. The enclosure as claimed in claim 15, wherein said locking portions are protrusions or holding tabs.

17. The enclosure as claimed in claim 15, wherein said locking section is a hole.

18. The enclosure as claimed in claim 15, wherein at least one of said two opposite planes integrally extends from the front plate.

19. The enclosure as claimed in claim 15, wherein at least one of said two opposite planes is discrete from the front plate.

* * * * *